United States Patent [19]

Noda

[11] Patent Number: 4,594,486

[45] Date of Patent: Jun. 10, 1986

[54] STEERING WHEEL PROVIDED WITH HORN SWITCH

[75] Inventor: Kazushi Noda, Inazawa, Japan

[73] Assignee: Toyoda Gosei Co., Ltd., Nishigasugai, Japan

[21] Appl. No.: 701,549

[22] Filed: Feb. 14, 1985

[30] Foreign Application Priority Data

Feb. 16, 1984 [JP] Japan .............................. 59-20731[U]

[51] Int. Cl.$^4$ .............................................. H01H 9/00
[52] U.S. Cl. .............................. 200/61.54; 200/61.55; 200/61.56
[58] Field of Search ................ 200/61.54, 61.55, 61.56

[56] References Cited

U.S. PATENT DOCUMENTS 4,374,310 2/1983 Kato et al. ....................... 200/61.55

*Primary Examiner*—A. D. Pellinen
*Assistant Examiner*—Morris Ginsburg
*Attorney, Agent, or Firm*—Cushman, Darby & Cushman

[57] ABSTRACT

A steering wheel has a ring, a boss positioned at the center of the ring, a spoke connecting the boss to the ring, a horn pad positioned on the boss. The horn pad has a shock absorber and a horn cover. Between the shock absorber and the horn cover is disposed a horn switch. The horn switch has a base plate fixed to the shock absorber, a horn plate positioned above and opposed to the base plate, a sheet spring member having a base portion fixed to the base plate through an insulating plate, and a plurality of foot portions supporting the horn plate, movable contact points secured to the foot portions of the sheet spring and fixed contact points secured to the base plate so as to be opposed to the movable contact points. The distance between the horn plate and the base plate is kept within the predetermined distance by means of engaging portions formed on the horn plate and the insulating plate, respectively. When the horn plate is pushed through the horn cover, the engaging portions are unengaged and the horn plate moves downward so that the foot portions flex downward. The movable contact points come in contact with the fixed contact points. As a result electric current flows into a horn through the horn switch to sound the horn.

3 Claims, 5 Drawing Figures

STEERING WHEEL PROVIDED WITH HORN SWITCH

BACKGROUND OF THE INVENTION

The present invention relates to a steering wheel of an automobile, particularly to the structure of a horn switch installed therein.

On the boss positioned at the center of the steering wheel is generally provided a horn pad. The horn pad is composed of a shock absorber and a horn cover for covering the shock absorber. And a horn switch is accommodated in the space formed between the upper surface of the shock absorber and the under surface of the horn cover.

The height of the horn pad is limited within the predetermined range, accordingly the horn switch is required to have a compact and thin structure. However, as the structure of the horn switch becomes thinner, the distance between contact points thereof decreases to incur the enaneous operation of the horn due to the vibration of the body of an automobile or the driver's erroneous touch.

By increasing the distance between the contact points, such enoneous operation can be prevented. However, as the above distance increases, the structure of the horn switch becomes thicker. Consequently, the height of the shock absorber must be reduced by the height corresponding to the increased thickness of the structure of the horn switch. In addition, in this case, the horn cover must be deeply pushed in when the horn is required to be sounded.

SUMMARY OF THE INVENTION

One object of the present invention is to provide a steering wheel for an automobile provided with a horn switch having a compact and thin structure.

Another object of the present invention is to provide a steering wheel provided with a horn switch which is easily operated and is free from the misoperation.

Still another object of the present invention is to provide a horn switch having such a structure as to be easily assembled into a horn pad.

The steering wheel of the present invention is provided with a horn switch disposed in the space between the upper surface of the shock absorber which is provided on the boss and the underside of the horn cover.

The horn switch comprises a base plate, a sheet spring having a base portion fixed to the base plate and a plurality of elastically flexible foot portions standing up from the base portion, a horn plate supported by the foot portions so as to be opposed to the base plate, a horn plate stopping means for stopping the horn plate from moving upward beyond the predetermined distance from the base plate, overcoming the biasing force, a plurality of movable contact points which vertically move with the horn plate, a plurality of fixed contact points which are formed on the base plate so as to come in contact with the movable contact points, and a power supplying means for connecting the movable contact points and the fixed contact points to both of a horn and an electric power source. The movable contact points come in contact with the fixed contact points by pushing the horn plate through the horn cover which covers the horn plate to flex the foot portions of the sheet spring.

DETAILED DESCRIPTION OF THE INVENTION

Figure 1:
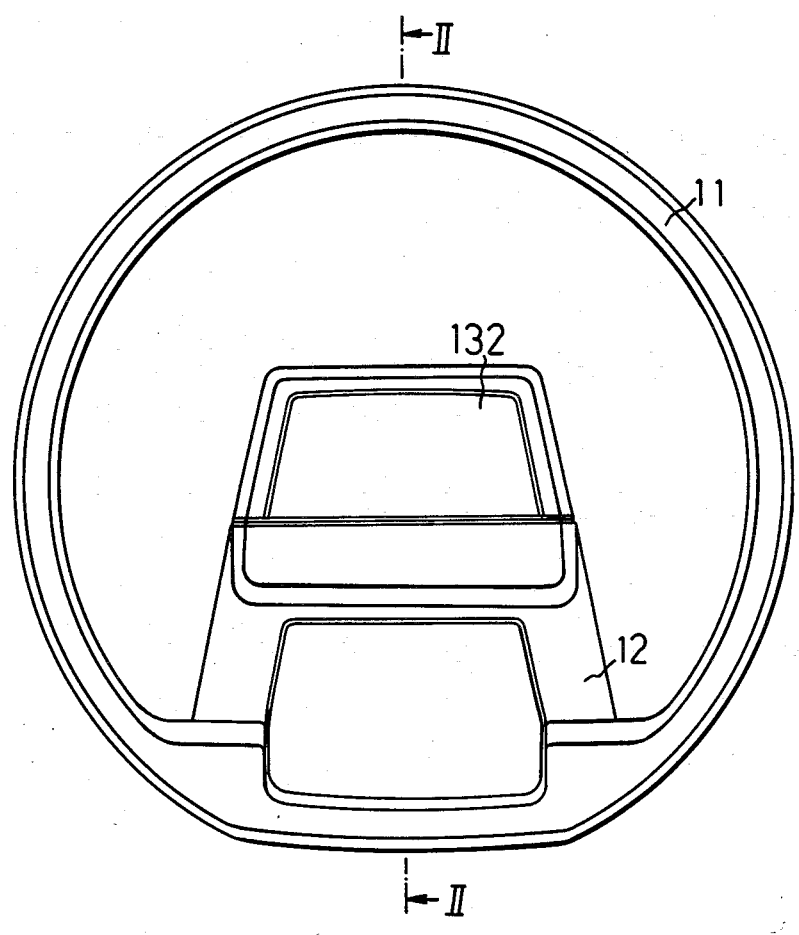
FIG. 1 is a front view of a steering wheel according to the present invention.
Figure 2:
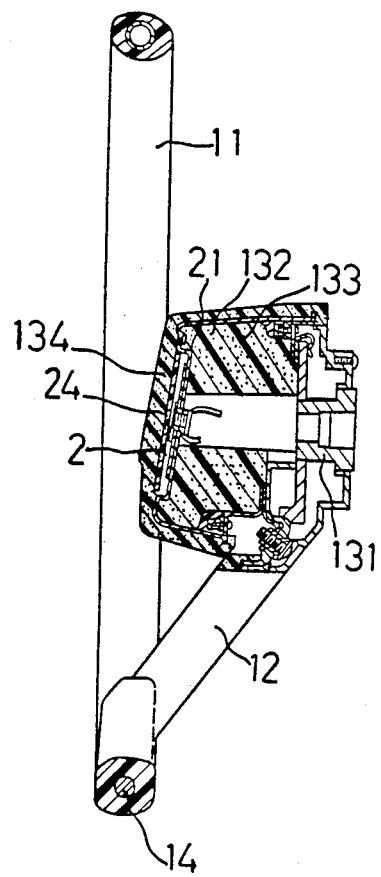
FIG. 2 is a sectional view of the steering wheel taken along the line II—II of FIG. 1.

In FIGS. 1 and 2, a ring 11 and a spoke 12 are integrally formed of synthetic resin wherein a core member 14 is embedded. The ring 11 is connected to a boss 131 by the spoke 12. A horn pad 132 is formed on the boss 131. The boss is fixed to the top end of a steering shaft (not shown).

The horn pad 132 is composed of a shock absorber 133 provided on the boss 131, and a horn cover 134 which covers the shock absorber 133. The shock absorber 133 has a cylindrical shape and is made of such a material as to absorb kinetic energy in the deforming step. For example, hard foamed urethane is used.

The horn cover 134 is made of soft foamed urethane or the like. A space is formed between the upper surface of the shock absorber 133 and the underside of the horn cover 134 and a horn switch 2 is disposed in the formed space.

Figure 3:
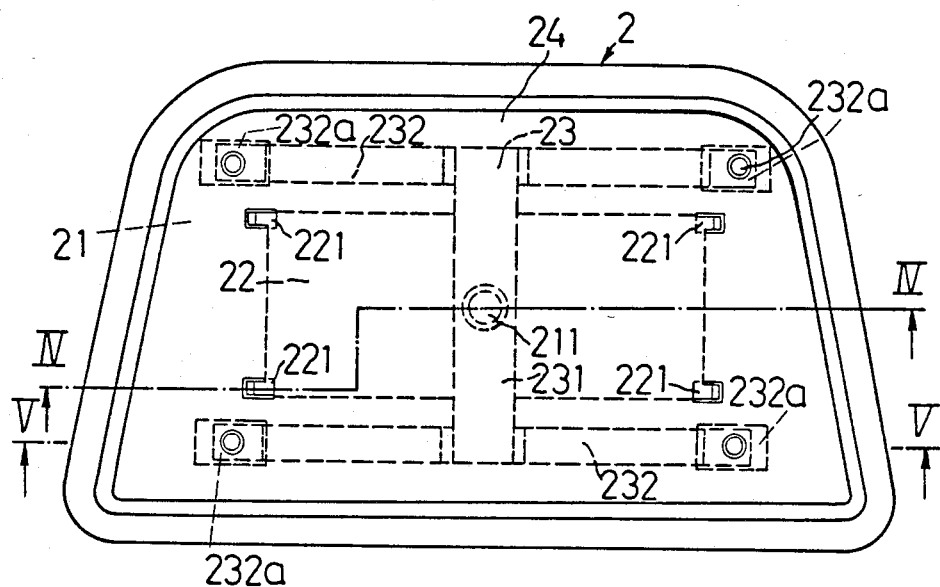
FIG. 3 is a front view of a horn switch installed in the steering wheel according to the present invention.
Figure 4:
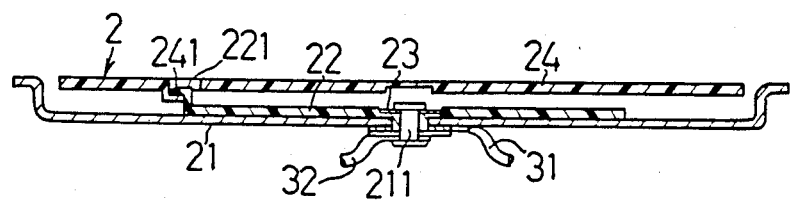
FIGS. 4 and 5 are sectional views taken along the lines IV—IV and V—V of FIG. 3, respectively.
Figure 5:
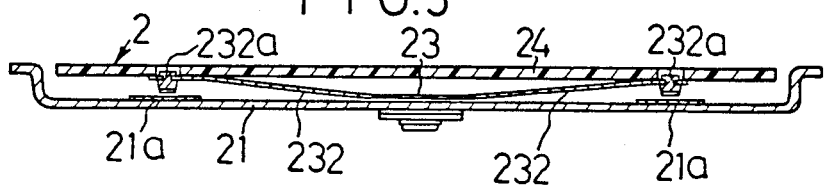

Hereinafter, the structure of the horn switch 2 will be explained with reference to FIGS. 3 to 5.

The horn switch 2 is provided with a metallic base plate 21, a sheet spring member 23 fixed to the base plate 21 through an insulating plate 22, and a plastic horn plate 24 disposed on the sheet spring member 23.

The insulating plate 22 is a rectangular shape and is placed on the central portion of the base plate 21. Four corner portions of the insulating plate 22 are upwardly bent to form letter Z-shaped engaging portions 221. The sheet spring member 23 is composed of an integrally formed metallic plate. The sheet spring member 23 has a letter H-shaped plane and is composed of a pair of parallel foot portions 232 and a base portion 231 which connects the center of the foot portions 232. The base portion 231 is placed on the insulating plate 22 so as to cross the center thereof and is fixed to the base plate 21 through the insulating plate 22 by means of a rivet 211. Both side portions of each foot portion 232 slope upwardly.

To both ends of each foot portion 232 is respectively. secured a contact point member 232a made of copper and provided with a contact surface made of silver.

On the base plate 21 is provided a contact point member 21a made of phosphor bronze at such a position as to be opposed to each contact point member 232a.

The horn plate 24 is made of plastic and is placed on the sheet spring 23. Letter-L shaped engaging portions 241 are formed in the underside of the horn plate 24 at such positions as to be opposed to the engaging portions 221 of the insulating plate 22. The engaging portions 221 and 241 connect the horn plate 24 to the base plate 21 so as to space them by a predetermined distance, overcoming the spring force of the sheet spring member 23.

When the horn plate 24 is pushed downward for sounding the horn, the engaging portions 221, 241 are unengaged and the horn plate 24 moves downward.

Each movable contact point member 232a on the horn plate 24 comes in contact with each fixed contact point member 21a on the base plate 21. As described above, the engaging members 221 and 241 compose a horn plate stopping means for stopping the horn plate from moving upward beyond the predetermined distance from the base plate, overcoming the spring force.

The base plate 21 is electrically connected to the boss 131 by way of a lead wire 31 while the sheet spring member 23 is electrically connected to the slip ring (not shown) through the rivet 211 and a lead wire 32.

The slip ring is secured to the boss 131 so as to be insulated therefrom and is connected to a horn(not shown) through a brush(not shown).

The horn switch having the above described structure is installed in the steering wheel by fitting the vessel-shaped base plate 21 in the vessel-shaped concave portion of the shock absorber 134. The horn plate 24 is covered with a horn cover 134.

When the horn plate 24 is pushed through the horn cover 134, each foot portion 232 of the sheet spring member 23 flexes downward so that each movable contact point member 232a comes in contact with each fixed contact point member 21a. As a result, current flows into the horn and then the horn begins to sound.

In the horn switch of the steering wheel of the present invention, upward biasing force is applied to the horn plate 24. Therefore, the horn switch of the present invention does not operate erroneously to sound the horn though the distance between the fixed contact point member 21a and the movable contact point member 232a is small.

Therefore, according to the present invention, the structure of the horn switch can be made thin.

Furthermore, according to the present invention, the plate biasing means is composed of a sheet spring having a plurality of foot portions and the contact point member is provided in each foot portion. Therefore, the structure of the plate biasing means and the contact point can be made simple.

In addition, in the horn switch of the present invention, the engaging portion 221 of the base plate 21 is integrally engaged with the engaging portion 241 of the horn plate 24. Therefore, the horn switch can be easily installed in the horn pad.

What is claimed is:

1. A steering wheel provided with a horn switch for use in an automobile comprising:
a ring portion;
a boss portion positioned at the center of said ring portion;
a spoke portion connecting said boss portion to said ring portion;
a horn pad having a shock absorber provided on said boss portion and a cover member covering said shock absorber;
said horn switch being provided between an upper surface of said shock absorber and an under surface of said cover member; said horn switch comprising:
a base plate fixed to the upper surface of said shock absorber;
a horn plate positioned above said base plate so as to be opposed to said base plate; said horn plate being covered with said cover member;
a horn plate supporting means composed of a sheet spring member having a base portion and a plurality of foot portions, each foot portion obliquely extending upward from each end of said base portion, said foot portions supporting said horn plate in their ends; said base portion being fixed to said base plate through an insulating plate;
a horn plate stopping means for stopping said horn plate from moving upward beyond a predetermined distance from said base plate, overcoming a biasing force of said horn plate supporting means;
a plurality of fixed contact points provided in said base plate;
a plurality of movable contact points vertically moving with said horn plate and coming in contact with said fixed contact points; and
an electric power supplying means for electrically connecting said plurality of fixed contact points and said plurality of movable contact points to a horn and an electric power source.

2. A steering wheel according to claim 1, wherein each of said movable contact points is secured to an under surface of each of said foot portions of said sheet spring member, and each of said fixed contact points is secured to said base plate so as to be opposed to each of said movable contact points.

3. A steering wheel according to claim 2, wherein said horn plate stopping means comprises one set of engaging portions formed on an under surface of said horn plate and another set of engaging portions, each of said another set of engaging portions projecting upward from an edge of said insulating plate, said another set of engaging portions engage with said one set of engaging portions to stop the upward movement of said horn plate when said horn plate moves upward by the predetermined distance from said base plate.

* * * * *